United States Patent Office 3,123,636

Patented Mar. 3, 1964

1

3,123,636

THIURONIUM HALIDES

Bernard Loev, Broomall, and John T. Massengale, West Chester, Pa., assignors to Pennsalt Chemicals Corporation, Philadelphia, Pa., a corporation of Pennsylvania No Drawing. Filed Feb. 8, 1960, Ser. No. 7,140
7 Claims. (Cl. 260—552)

This invention deals with a novel class of thiuronium halides useful as insect attractants, as surfactants and as bactericides. The particular class of thiuronium halides of this invention is characterized by the formula $$[R^5{-}S{=}C{-}(NR^1R^2)(NR^3R^4)]^+X^-$$

where $R^1$, $R^2$, $R^3$ and $R^4$ are lower alkyl radicals, $R^5$ is a benzyl radical substituted with a long chain alkyl group, and $X^-$ is a halogen ion.

The novel thiuronium halides of this invention are readily prepared by reacting essentially stoichiometric amounts of an organic halide $R^5X$ (where $R^5$ and X are defined above) and a N,N,N',N'-tetra-lower alkyl substituted thiourea. The reaction is preferably carried out in a solvent medium which is usually a lower aliphatic alcohol such as methanol, ethanol, n- or iso-propanol, n-butanol and the like. Gentle warming of the reactants in the solvent usually initiates reaction and to ensure completion, the reaction mass is generally refluxed for a few hours. The product thiuronium salt is easily recovered from the reaction mass by vacuum distilling off the solvent, leaving behind the viscous oily product. In lieu of alcohol solvents other solvent reaction media may be used such as N-substituted acylamides (e.g., dimethylformamide, diethylforamamide) nitroalkanes (e.g., nitromethane), ethers and the like. The reaction will also proceed in the absence of a solvent, the reagents simply being heated together and the product readily isolated by adding ether to remove any unreacted reagents and leave insoluble product.

The N,N,N',N'-tetra-substituted thiourea starting material will have the structure

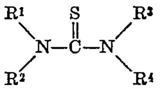

where $R^1$, $R^2$, $R^3$ and $R^4$ are alkyl groups containing from one to four carbon atoms. It is to be understood that these alkyl groups may be the same or different. The following compounds illustrate the substituted thioureas that may be used: tetramethylthiourea, tetraethylthiourea, N,N'-dimethyl-N,N'-diethylthiourea, N,N,N'-trimethyl-N'-butylthiourea, N,N-dimethyl-N',N'-diisopropylthiourea, and the like.

The organic halide ($R^5$—X) reactant will be a benzyl halide having as a substituent a long chain alkyl group. This long chain radical will contain from about 8 to about 18 carbon atoms. The benzyl halide, which may be a chloride, bromide, or other halogenide may also be substituted with other alkyl groups. Illustrative examples of the benzyl halide are octylbenzyl bromide, decylbenzyl chloride, dodecylmethylbenzyl chloride, hexadecylethylbenzyl chloride, dioctadecylbenzyl chloride, and the like.

The reaction process that yields the thiuronium halide is illustrated by the following equation:

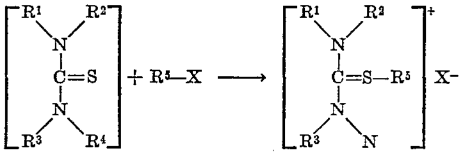

It will be understood that the positively charged thiuronium radical is capable of resonance and can be represented by placing the double bond between the carbon and nitrogen atoms:

2

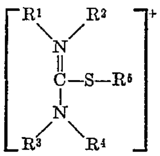

and

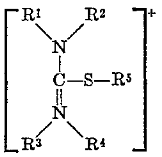

Likewise the compounds may be represented by the following structures:

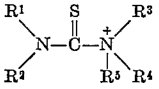

and

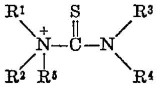

The thiuronium halides of this invention are viscous oils which are soluble in water, benzene, alcohol and acetone, but they are insoluble in petroleum ether. Their aqueous solutions foam and thus indicate their strong surfactant properties. A peculiar and surprising property of these thiuronium halides is their ability to attract insects, particularly roaches, and they are therefore of great value in traps and insecticide formulations. This utility is fully disclosed in the copending application of Oliver S. Sprout, Jr., Serial No. 567,086, filed February 23, 1956, and issued on June 14, 1960, as U.S. Patent 2,940,896. As illustrated therein, when as little as 0.001 gram of dodecylmethylbenzyl-N,N,N',N'-tetramethylthiuronium chloride was used to impregnate a cotton swab and the swab placed in a cage, twenty-two roaches from a nearby source visited the cage in one hour. In the absence of the agent in the cage, only two roaches visited the cage in one hour.

In addition to being useful as surfactants and roach attractants, these thiuronium halides are effective bactericides. When evaluated in the standard phenol coefficient procedure, dodecylmethylbenzyl-N,N,N',N'-tetramethyl thiuronium chloride was effective against gram-positive bacteria at concentrations between 0.01% and 0.001%.

The following examples illustrate the preparation of these novel compounds.

*Example 1*

A mixture of dodecylmethylbenzyl chloride (100 g., 0.324 mole) and tetramethylthiourea (42.8 g., 0.324 mole) was prepared in ethanol (150 cc.). After warming to 30° C., the mixture cleared and a golden solution formed. The reaction mass was held at reflux for two hours and the ethanol was then removed by vacuum distillation. The product dodecylmethylbenzyl-N,N,N',N'-tetramethylthiuronium chloride was a golden yellow viscous oil ($N_D^{23}$ 1.5258). A test for ionic chlorine was positive.

*Example 2*

Dodecylbenzyl chloride (0.339 mole) and tetramethylthiourea (0.339 mole) were reacted in ethanol and the product recovered in accord with the procedure of Example 1. The dodecylbenzyl-N,N,N',N'-tetramethylthiuronium chloride was a light yellow viscous oil ($n_D^{21}$ 1.5240) which was soluble in water, benzene and acetone, but insoluble in petroleum ether.

*Example 3*

Example 2 was repeated with tetraethylthiourea instead of tetramethylthiourea. The viscous oil-like dodecylbenzyl-N,N,N',N'-tetraethylthiuronium chloride product was soluble in water, benzene, acetone, alcohol, but insoluble in ether and petroleum ether.

When octylbenzyl bromide is used in the above example instead of dodecylbenzene, octylbenzyl-N,N,N',N'-tetraethylthiuronium bromide is obtained as a viscous oil which is soluble in water, benzene and acetone, but insoluble in ether. Shaking its water solution causes foaming, thus illustrating the surfactant properties of the compound.

In like manner octadecylbenzyl-N,N,N',N'-tetramethylthiuronium chloride is obtained by carrying out Example 1 with octadecylbenzyl chloride instead of dodecylbenzyl chloride.

It will be understood that many different embodiments of this invention will be obvious to those skilled in the art and accordingly the invention is not to be limited to the specific embodiments set out above.

We claim:

1. A compound of the formula

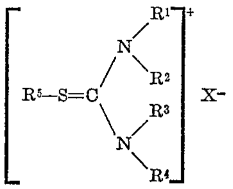

where $R^1$, $R^2$, $R^3$ and $R^4$ are lower alkyl radicals, $R^5$ is a substituted benzyl radical wherein said substituent is an alkyl radical having from eight to eighteen carbon atoms, and $X^-$ is a halide ion.

2. A compound of claim 1 where $X^-$ is a chloride ion.

3. Dodecylmethylbenzyl - N,N,N',N' - tetramethylthiuronium chloride.

4. Dodecylbenzyl - N,N,N',N' - tetramethylthiuronium chloride.

5. Dodecylbenzyl - N,N,N',N' - tetraethylthiuronium chloride.

6. Octylbenzyl - N,N,N',N' - tetraethylthiuronium bromide.

7. Octadecylbenzyl - N,N,N',N' - tetramethylthiuronium chloride.

References Cited in the file of this patent

UNITED STATES PATENTS

| | | |
|---|---|---|
| 2,607,803 | Lecher et al. | Aug. 19, 1952 |
| 2,640,079 | De Benneville et al. | May 26, 1953 |
| 2,940,896 | Sprout | June 14, 1960 |
| 2,980,734 | Kosmin | Apr. 18, 1961 |
| 2,999,046 | Rosen | Sept. 5, 1961 |